United States Patent Office 2,853,518
Patented Sept. 23, 1958

2,853,518
CHEMICAL PROCESS

Walter J. Balon, Carney's Point, N. J., assignor to E. I. du Pont de Nemours and Company, Wilmington, Del., a corporation of Delaware No Drawing. Application July 30, 1956
Serial No. 600,692

3 Claims. (Cl. 260—551)

This invention relates to a process for the preparation of carbodiimides, and more particularly to a process for the preparation of carbodiimides involving the use of phospholines or phospholidines as catalysts.

Carbodiimide type compounds, such as diphenyl carbodiimide, are known. These compounds have been described in Chemical Reviews, vol. 53 (1953), pages 145–166, and in Chemistry of Carbon Compounds, vol. III–A, page 205, Elsevier Publishing Company (1954). In general, these carbodiimides have been prepared by treating a di-substituted thiourea with a metallic oxide, such as mercuric oxide. This method of preparation is not entirely satisfactory in view of the attendant side reactions, such as the reaction of the water by-product with the carbodiimides to form a urea. Accordingly, it would be highly desirable to provide a process for the preparation of these carbodiimides which is free of these undesirable features.

It is an object of the present invention to provide a process for the preparation of carbodiimides. A further object is to provide a process for the preparation of carbodiimides involving the treatment of isocyanates with catalytic amounts of phospholines or phospholidines. Other objects will appear hereinafter.

These and other objects of the following invention are accomplished by the process of preparing organic carbodiimides which comprises treating an organic isocyanate with a catalytic amount of a phospholine or a phospholidine. The reaction involved is between the isocyanate groups with the formation of a carbodiimide and the liberation of carbon dioxide. Using phenylisocyanate the reaction proceeds as follows:

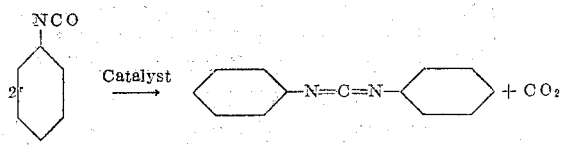

In carrying out the process of the present invention, any organic isocyanate may be used, such as an aromatic, aliphatic or cycloaliphatic type. These organic isocyanates may contain other substituents; however, it is readily apparent that the substituents should not be reactive with the isocyanate group. Therefore, they should not be of the active hydrogen-containing type which display activity according to the Zerewitinoff test. Representative organic isocyanates are methylisocyanate, ethylisocyanate, butylisocyanate, octylisocyanate, octadecylisocyanate, allylisocyanate, vinylisocyanate, pentylisocyanate, phenylisocyanate, o-tolueneisocyanate, p-tolueneisocyanate, o-nitrophenylisocyanate, p-chlorophenylisocyanate, p-methoxyphenylisocyanate, p-biphenylylisocyanate, cyclohexylisocyanate, and decahydronaphthylisocyanate. It is to be understood that mixtures of isocyanates may be used to form unsymmetrical carbodiimides.

The phospholines or phospholidines serve as catalysts for the preparation of the organic carbodiimides. Accordingly, catalytic amounts of from about 0.4 to 5.0 parts of catalyst per 100 parts of organic isocyanate should be used. The phospholines which are useful in the process of the present invention are compounds having the formula

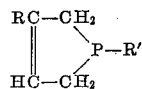

wherein R is a radical selected from the group consisting of hydrogen, lower alkyl and lower alkenyl, and R' is a radical selected from the group consisting of lower alkyl, and phenyl radicals. It is to be understood that this phenyl radical may contain inert substituents such as alkyl or halogen radicals. Representative phospholines include 1-phenyl-3-phospholine, 3 - methyl - 1 - phenyl-3-phospholine, 1-ethyl-3-phospholine, 3-isopropyl-1-phenyl-3-phospholine, and 3-(4-pentenyl)-1-phenyl-3-phospholine. For purposes of the present invention, 3-methyl-1-phenyl-3-phospholine is preferred.

The phospholidines which may be used in the process of the present invention are compounds having the formula

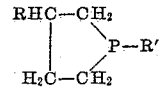

wherein R and R' have the significance defined above. Representative phospholidines include 1-phenylphospholidine, 3-methyl-1-ethylphospholidine, 3-methyl-1-phenylphospholidine, and 1-ethylphospholidine. For purposes of the present invention, 3-methyl-1-ethylphospholidine is preferred.

In carrying out the process of the present invention, it is necessary merely to treat the organic isocyanate with a catalytic amount of the phospholine or phospholidine. As the organic carbodiimide is formed, carbon dioxide is liberated and this carbon dioxide may be vented from the reaction medium if desired. In carrying out the process of the present invention, it is usually desirable to heat the organic isocyanate with the catalyst to a temperature of from about 40–150° C. It is to be understood that with particularly active organic isocyanates and catalysts, heating may not be necessary.

The process of the present invention may be carried out in an inert solvent such as benzene, toluene, xylene, etc. It is most desirable to use a solvent when the organic isocyanate is a solid, such as octadecylisocyanate; however, in the case where the organic isocyanate is a liquid, the use of an inert solvent is not necessary. Many of the liquid carbodiimides may be recovered by fractional distillation. Some of the solid carbodiimides may also be distilled at low pressures. The solid carbodiimides may be purified by crystallization from a suitable solvent such as petroleum ether.

While the process of the present invention has been illustrated by the catalytic action of a phospholine or a phospholidine on an organic isocyanate, it is to be understood that an organic diisocyanate may be treated with a phospholine or a phospholidine catalyst to form a polymer containing a plurality of carbodiimide linkages. In the case of a simple diisocyanate, such as a toluenediisocyanate, linear polymers are obtained with recurring carbodiimide linkages. In addition, isocyanate, terminated polymers, such as high molecular weight polyurethanes obtained by the reaction of a polyalkyleneether glycol with a molar excess of an organic diisocyanate may be used to form a polymer containing carbodiimide linkages. In this case, when the isocyanate-terminated polyurethanes are of relatively high molecular weight, elastomeric products are obtained. The process of the present invention may also be carried out using an organic isocyanate having three or more free isocyanate groups. The resulting polymers in this case will be cross-linked and contain carbodiimide linkages.

The carbodiimides which are prepared according to the process of this invention have a number of interesting uses in chemical synthesis due to the reactivity of the N=C=N group which readily adds active hydrogen to the nitrogen, such as the hydrogen on OH, $NH_2$, etc. Dicyclohexyl carbodiimide acts as a co-reactant in the formation of amides from amines and free carboxylic acids, forming dicyclohexyl urea as a by-product of the reaction. Carbodiimides may also be reacted with soda cellulose to form a modified cellulose as disclosed in U. S. Patent 2,415,034. The products of the reaction, depending on the particular conditions, are useful as textile sizers, coating compositions and molding powders.

The following examples will better illustrate the nature of the present invention; however, the invention is not intended to be limited to these examples. Parts are by weight unless otherwise indicated.

EXAMPLE 1

A. *Preparation of 3-methyl-1-phenyl-3-phospholine*

Equimolar quantities of freshly distilled isoprene and dichlorophenylphosphine are mixed at room temperature and let stand until a solid mass is formed. The adduct is crushed, washed with ligroin and reduced with an ethereal lithium aluminum hydride solution. The mixture is decomposed with aqueous alcohol and the ether layer separated. The ether layer is washed with alkali solution, dried, the ether evaporated and the residue distilled under vacuum. The 3-methyl-1-phenyl-3-phospholine boils at 150–151° C. at 30 mm. of mercury pressure.

B. *Treatment of phenylisocyanate*

0.4 part of the 3-methyl-1-phenyl-3-phospholine is added to 9.6 parts of phenylisocyanate at room temperature. Bubbles of carbon dioxide are evolved. The mass is gradually heated to 160° C. until gas evolution ceases. The mixture is distilled, the diphenylcarbodiimide boiling at 171–175° C. at 12 mm. of mercury pressure.

EXAMPLE 2

To 120 parts of phenylisocyanate is added 0.5 part of 1-phenylphospholidine and the mixture is heated under nitrogen. At 140° C. carbon dioxide begins to evolve and at 150° C. the evolution of carbon dioxide is brisk. After the evolution of gas stops, the mixture is distilled under vacuum. 87 parts of diphenylcarbodiimide is obtained at 110–120° C. at 0.5 mm. of mercury pressure. Infra-red analysis shows a very strong absorption for the carbodiimide grouping.

EXAMPLE 3

A. *Preparation of 1-ethylphospholidine*

A Grignard reagent formed from 65 parts of 1,4-dichlorobutane and 24 parts of magnesium is treated with 65 parts of ethyl phosphorus dichloride at 0–5° C. When the addition is complete, the mass is refluxed for 2 hours. 1000 parts of ice water is added, the mixture made slightly alkaline with sodium hydroxide and the ether layer separated. The ether layer is dried, the ether removed and the 1-ethylphospholidine is distilled at 0.5 mm. of mercury pressure, boiling at 78–82° C.

B. *Treatment of phenylisocyanate*

0.4 part of the 1-ethylphospholidine is added to 9.6 parts of phenylisocyanate at room temperature. Bubbles of carbon dioxide are evolved. The mass is gradually heated to 160° C. until gas evolution ceases. The mixture is distilled, the diphenylcarbodiimide boiling at 171–175° C. at 12 mm. of mercury pressure.

EXAMPLE 4

75 parts of p-tolueneisocyanate is dissolved in 150 parts of xylene and 0.5 part of 3-methyl-1-phenyl-3-phospholine is added. The solution is heated to reflux for 4 hours and then the xylene is distilled off under vacuum. The residue is then taken up in hot petroleum ether, a small amount of activated charcoal added, and the mixture filtered. The petroleum ether is evaporated to incipient crystallization and then cooled. The p-tolylcarbodiimide separates as white crystals. The crystals are filtered off, washed with a little cold petroleum ether, filtered and dried. Infra-red absorption spectra show the characteristic absorption in the 4.7 mu range. The crystals melt at 55–57° C.

EXAMPLE 5

50 parts of propylisocyanate is dissolved in 100 parts of xylene and 1 part of 1-phenylphospholidine is added. The solution is then heated to reflux for 16 hours. The xylene is removed under vacuum and the dipropylcarbodiimide is recovered by fractional distillation, boiling at 56–58° C. at 11 mm. of mercury pressure. The nearly colorless liquid shows a strong absorption in the infra-red at 4.7 mu.

EXAMPLE 6

60 parts of cyclohexylisocyanate is dissolved in 100 parts of xylene and 2 parts of 3-methyl-1-phenylphospholidine is added. The solution is then heated to reflux for 16 hours. The xylene is removed under vacuum and the dicyclohexylcarbodiimide is recovered by fractional distillation, boiling at 150–152° C. at 10 mm. of mercury pressure. The colorless liquid shows a strong absorption in the infra-red at 4.75 mu. On standing, the liquid turns to a solid crystalline mass.

EXAMPLE 7

20 parts of p-chlorophenylisocyanate is dissolved in 40 parts of toluene and 1 part of 1-phenyl-phospholidine is added. The solution is then heated to reflux for 16 hours. The toluene is removed under vacuum. The residue is taken up in petroleum ether, filtered, evaporated to incipient crystallization and then cooled. The nearly colorless crystals of di(p-chlorophenyl)carbodiimide form and are filtered off, washed with petroleum ether, and dried.

EXAMPLE 8

40 parts of allylisocyanate is dissolved in 100 parts of toluene and 1 part of 3-methyl-1-phenyl phospholidine is added. The solution is refluxed for 16 hours. The toluene is distilled off and diallylcarbodiimide is recovered by fractional distillation, boiling at 58–60° C. at 10 mm. of mercury pressure. It is a colorless liquid.

EXAMPLE 9

40 parts of butylisocyanate is dissolved in 60 parts of xylene and 2 parts of 1-ethyl phospholidine is added. The solution is refluxed for 16 hours. The xylene is distilled off and the dibutylcarbodiimide is recovered by fractional distillation. It is a colorless liquid boiling at 83–85° C. at 10 mm. of mercury pressure.

EXAMPLE 10

75 parts of p-methoxyphenylisocyanate is dissolved in 75 parts of toluene and 1 part of 3-methyl-1-phenyl-3-phospholine is added. The solution is refluxed for 12 hours. The toluene is distilled off and the residue is taken up in hot petroleum ether. Activated charcoal is added and the mixture is stirred hot a few minutes and then filtered. The filtrate is evaporated to incipient crystallization and then cooled. Practically colorless crystals of di(p-methoxyphenyl)carbodiimide are obtained. The mass of crystals is filtered off, washed with a little cold petroleum ether and dried. The melting point is 52–53° C. A mixed melting point with an authentic sample prepared by conventional methods from di(p-methoxyphenyl)-thiourea and mercuric oxide shows no depression.

As many widely different embodiments of this invention may be made without departing from the spirit and scope thereof, it is to be understood that this invention is not limited to the specific embodiments thereof except as defined in the appended claims.

What is claimed is:

1. In the process for preparing organic carbodiimides from organic isocyanates having no active hydrogen-containing substituents which are reactive with an isocyanate group, the step comprising treating said organic isocyanate with from about 0.4 to 5.0 parts by weight of a phosphorus compound per 100 parts by weight of said isocyanate, said phosphorus compound being selected from the group consisting of a substituted phospholine having the formula

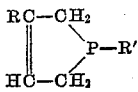

and a substituted phospholidine having the formula

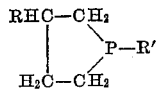

wherein R is a radical selected from the group consisting of hydrogen, lower alkyl and lower alkenyl, and R' is a radical selected from the group consisting of a phenyl radical and a lower alkyl radical.

2. A process according to claim 1 wherein the phosphorus compound is 3-methyl-1-phenyl-3-phospholine.

3. A process according to claim 1 wherein the phosphorus compound is 3-methyl-1-ethylphospholidine.

References Cited in the file of this patent

Saunders et al.: Chemical Reviews, vol. 43, page 214 (1948).

Stolle: Berichte Deutsche Chemische Gesellschaft, vol. 41, pages 1125–1126 (1908).